(12) United States Patent
Narayanan

(10) Patent No.: US 9,176,853 B2
(45) Date of Patent: Nov. 3, 2015

(54) MANAGING COPY-ON-WRITES TO SNAPSHOTS

(75) Inventor: Priyesh Narayanan, Kerala (IN)

(73) Assignee: Symantec Corporation, Mountain View, CA (US)

(*) Notice: Subject to any disclaimer, the term of this patent is extended or adjusted under 35 U.S.C. 154(b) by 812 days.

(21) Appl. No.: 12/697,074

(22) Filed: Jan. 29, 2010

(65) Prior Publication Data

US 2011/0191555 A1 Aug. 4, 2011

(51) Int. Cl.
| | |
|---|---|
| *G06F 12/00* | (2006.01) |
| *G06F 13/00* | (2006.01) |
| *G06F 13/28* | (2006.01) |
| *G06F 3/06* | (2006.01) |
| *G06F 12/16* | (2006.01) |

(52) U.S. Cl.
CPC ............... *G06F 12/00* (2013.01); *G06F 3/065* (2013.01); *G06F 3/067* (2013.01); *G06F 3/0614* (2013.01); *G06F 12/16* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 6,014,669 A | 1/2000 | Slaughter et al. | |
| 6,038,639 A | 3/2000 | O'Brien et al. | |
| 6,460,054 B1* | 10/2002 | Grummon ............................ 1/1 |
| 6,560,614 B1 | 5/2003 | Barboy et al. | |
| 7,149,858 B1 | 12/2006 | Kiselev | |
| 7,188,128 B1 | 3/2007 | Nagaraj et al. | |
| 7,194,487 B1 | 3/2007 | Kekre et al. | |
| 7,254,682 B1* | 8/2007 | Arbon ............................ 711/161 |
| 7,266,652 B1* | 9/2007 | Hotle et al. .................... 711/158 |
| 7,373,520 B1 | 5/2008 | Borthakur et al. | |
| 7,565,419 B1 | 7/2009 | Kwiatkowski et al. | |
| 7,774,444 B1 | 8/2010 | George et al. | |
| 7,797,357 B1 | 9/2010 | Nagaraj et al. | |
| 7,805,536 B1 | 9/2010 | Kompella et al. | |
| 7,886,119 B1 | 2/2011 | Cameron et al. | |
| 7,917,855 B1 | 3/2011 | Satish et al. | |
| 8,572,337 B1* | 10/2013 | Gokhale et al. ............... 711/162 |
| 2003/0159007 A1 | 8/2003 | Sawdon et al. | |
| 2004/0221125 A1* | 11/2004 | Ananthanarayanan et al. ............... 711/203 |
| 2006/0047926 A1* | 3/2006 | Zheng ............................ 711/162 |
| 2006/0123209 A1 | 6/2006 | Borland | |
| 2006/0123211 A1* | 6/2006 | Derk et al. .................... 711/162 |
| 2006/0155946 A1 | 7/2006 | Ji | |
| 2006/0206677 A1* | 9/2006 | Kim et al. ...................... 711/162 |
| 2007/0006018 A1 | 1/2007 | Thompson et al. | |
| 2007/0033356 A1 | 2/2007 | Erlikhman | |
| 2007/0061487 A1 | 3/2007 | Moore et al. | |
| 2007/0180307 A1 | 8/2007 | Zohar et al. | |
| 2007/0185938 A1 | 8/2007 | Prahlad et al. | |
| 2008/0104360 A1* | 5/2008 | Takeuchi et al. ............. 711/203 |
| 2008/0109494 A1 | 5/2008 | Chitre et al. | |

(Continued)

OTHER PUBLICATIONS

Non-Final Office Action Mail Date Dec. 20, 2011; U.S. Appl. No. 12/608,892.

(Continued)

*Primary Examiner* — Yaima Rigol
(74) *Attorney, Agent, or Firm* — Wilmer Cutler Pickering Hale and Dorr LLP

(57) ABSTRACT

An attempt to write to a block of data in a main volume of data is detected. An indicator associated with the block of data is accessed before a copy-on-write operation to a snapshot volume is performed for the block of data. The indicator is used to determine whether the copy-on-write operation is to be performed for the block of data.

20 Claims, 6 Drawing Sheets

(56) References Cited

U.S. PATENT DOCUMENTS

2008/0162590 A1 7/2008 Kundu et al.
2009/0187704 A1 7/2009 Rodgers
2009/0327568 A1 12/2009 Wayda et al.
2009/0327628 A1 12/2009 Narayanan et al.
2010/0030959 A1 2/2010 Satoyama et al.

OTHER PUBLICATIONS

Final Office Action Mail Date May 16, 2012; U.S. Appl. No. 12/608,892.

Non-Final Office Action Mail Date May 8, 2012; U.S. Appl. No. 12/619,495.

Non-Final Office Action Mail Date Dec. 1, 2011; U.S. Appl. No. 12/700,664.

Final Office Action Mail Date Jun. 12, 2012; U.S. Appl. No. 12/700,664.

Non-Final Office Action Mail Date Apr. 24, 2012; U.S. Appl. No. 12/827,911.

Symantec Corporation, "Veritas™ Volume Replicator Administrator's Guide, Solaris, 5.0 Maintenance Pack 3", 2008, Symantec Corporation, Cupertino, California, USA.

Symantec Corporation, "Veritas™ Volume Manager Administrator's Guide, Solaris, 5.0 Maintenance Pack 3", 2008, Symantec Corporation, Cupertino, California, USA.

\* cited by examiner

MANAGING COPY-ON-WRITES TO SNAPSHOTS

BACKGROUND

Snapshots are used to record and preserve the state of a volume of data at any given moment. There are many scenarios where a consumer application (e.g., a backup or replication application) takes a volume snapshot to create a consistent, point-in-time image of the stored information, in order to read blocks of data without interfering with another application (e.g., a database application) that is also making use of that information. These snapshots are, most of the time, solely for the purpose of the consumer application. The duration of the backup/replication task is also the lifetime of the snapshot. Depending upon the amount of data to be processed from the snapshot, this lifetime can be quite long, especially if the backup/replication application requires persisting the snapshot during the processing.

For the lifetime of the snapshot, there will be a copy-on-write overhead associated with every first write to a block in the volume of data, even for those blocks that have already been read by the consumer application. That is, even though a block in the volume has already been read by the consumer application and a point-in-time image of the data in that block is no longer needed for that purpose, the data in the block will still be copied from the volume to the snapshot if data is to be written to that block, unnecessarily incurring a copy-on-write overhead.

SUMMARY

In one embodiment, an attempt to write to a block of data in a main volume of data is detected. An indicator associated with the block of data is accessed before a copy-on-write operation to a snapshot volume is performed for the block of data. The indicator is used to determine whether the copy-on-write operation is to be performed for the block of data.

In another embodiment, a main volume comprising blocks of data is accessed. A subset of the blocks of data is designated as blocks that are not of interest. A copy-on-write (to a snapshot) of a block of data included in the subset is prevented; a copy-on-write (to the snapshot) of a block of data not included in the subset is allowed.

In yet another embodiment, a first application can write data to a main volume comprising blocks of data. A snapshot driver can create a snapshot for the main volume. A second application can read data from the main volume and from the snapshot. The second application designates a subset of the blocks of data as blocks that are not of interest. Advantageously, a copy-on-write of a block of data in the subset is not performed if the first application initiates a write to the block of data.

In the above embodiments, a block of data may be replicated (backed up) before that block is copy-on-written, in which case a copy-on-write is therefore not performed for that block of data. Alternatively, the snapshot volume may be for a portion of the main volume that does not include a particular block of data, in which case a copy-on-write is therefore not performed for that block of data. Then again, the snapshot volume may be for a file that spans a subset of the blocks that does not include a particular block of data, in which case a copy-on-write is therefore not performed for that block of data.

In one embodiment, a first bitmap of the main volume is maintained, to track which blocks in the main volume can be copy-on-written. A second bitmap of the main volume, which tracks the blocks that have been written to the snapshot volume, may also be used.

According to embodiments of the present disclosure, potential copy-on-writes for certain blocks are avoided, reducing the number of copy-on-writes and the associated overhead.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
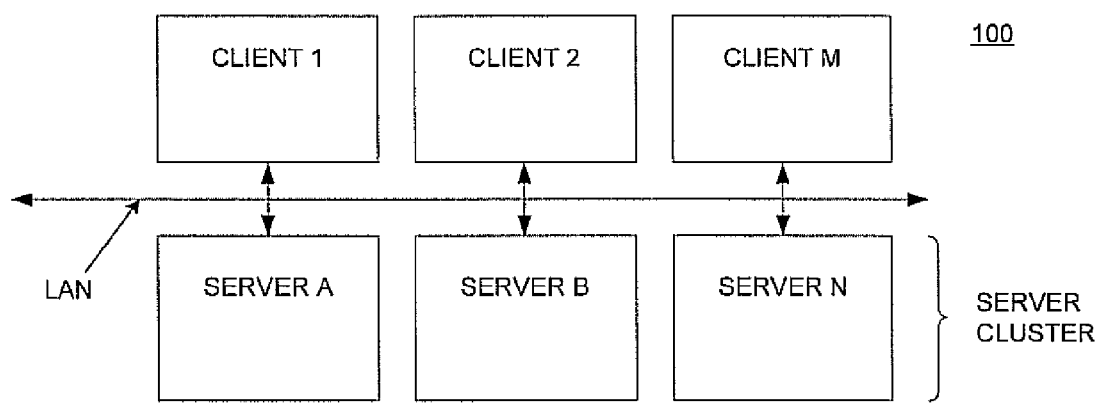
FIG. 1 is a block diagram depicting an example of a network architecture upon which embodiments according to the invention can be implemented.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "writing," "detecting," "determining," "performing," "maintaining," "updating," "replicating," "creating," "storing," "designating," "setting," or the like, refer to actions and processes (e.g., flowcharts 700 and 800 of FIGS. 7 and 8, respectively) of a computer system or similar electronic computing device or processor (e.g., system 210 of FIG. 2). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, program modules or other data in a modulated data signal and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

In overview, embodiments according to the present disclosure include systems that allow a snapshot driver to be aware of what blocks of data in a volume are of interest to applications which are consumers of a snapshot (e.g., backup or replication applications) and to use that knowledge to reduce the number of copy-on-writes (COWs). In one embodiment, the snapshot driver maintains a bitmap for the blocks in the volume, and implements an application programming interface (API) that the consumer application can call to set the bits in that bitmap. The consumer application can use the API to set a bit whenever the corresponding block in the volume is successfully read (backed up/replicated). The snapshot driver, in turn, can refer to the bitmap before performing a potential copy-on-write for a block, and proceeds with the copy-on-write if the corresponding bit is not set.

Embodiments according to the present disclosure also provide methods for reducing copy-on-writes in a backup/replication operation using snapshots, by making the snapshot driver aware of what blocks the backup/replication application (the consumer of the snapshot) is interested in at a particular point in time. In one embodiment, this awareness is implemented through a bitmap for blocks in the volume. The bitmap can be maintained by the snapshot driver and consulted when writes are about to happen to the main volume. The snapshot driver exposes an API that the consumer application can use to set the bits in this bitmap. The consumer application can set a bit when it is no longer interested in the corresponding block, which can happen for at least two reasons.

1. The consumer application was never interested in that block. For example, a) the snapshot was taken for an incremental backup and the given block is not one of the candidate blocks; or b) the given block is not part of a file included in the selection list. In these instances, the consumer application will set bits (corresponding to blocks not interested in) at the start of the backup/replication task (e.g., when the snapshot is created).
2. The block was successfully read (successfully backed up/replicated) by the consumer application. In this instance, the consumer application will set a bit as and/or when the read happens.

When a write is scheduled for a block, if the corresponding bit is set in the bitmap, the snapshot driver will not perform a copy-on-write for that block. Snapshot drivers may use such a bitmap to mark the bit for a block for which a copy-on-write is done once, so that next time a write happens to the same block, another copy-on-write is avoided. The same infrastructure can be leveraged so that embodiments according to the present disclosure do not increase overhead during a potential copy-on-write.

A separate thread in the driver can handle API calls by the consumer application. The API can be written in such a way so that multiple bits can be set using a single call. Note that no locks and such are necessary for the bitmap or the main volume, so that even if the snapshot driver happens to read an unset bit before the consumer application is able to set it, this will only result in an unnecessary copy-on-write—there is no data corruption or loss as far as the consumer application is concerned.

In effect, the bitmap is maintained in such a way that at any given point in time, it represents only blocks that are of interest to the consumer application, by having bits corresponding to those blocks unset in the bitmap. The snapshot driver, in turn, avoids potential copy-on-writes for blocks corresponding to the bits set in this bitmap.

FIG. 1 is a block diagram depicting a network 100 upon which embodiments of the present disclosure may be used. The network 100 may be known as a cluster file system, network file system, or storage area network. In general, the network 100 is one in which a set of computers (e.g., the system 210 of FIG. 2) can perform input/output (I/O) operations using, in one embodiment, a network of object storage devices that utilizes Internet Protocol (IP)-based storage and remote procedure calls.

In the example of FIG. 1, the network 100 includes servers A, B, . . . , N. Collectively, the server nodes may be referred to as a server cluster. The server nodes may be data servers that communicate with metadata servers (not shown), or the server nodes may be data servers that perhaps incorporate the functionality of a metadata server.

The clients 1, 2, . . . , M can access the servers A, B, . . . , N, via a local area network (LAN), storage area network (SAN), or wide area network (WAN). Also, the client nodes may communicate with each other, and the server nodes may communicate with each other, via the LAN, SAN, or WAN.

Figure 2:
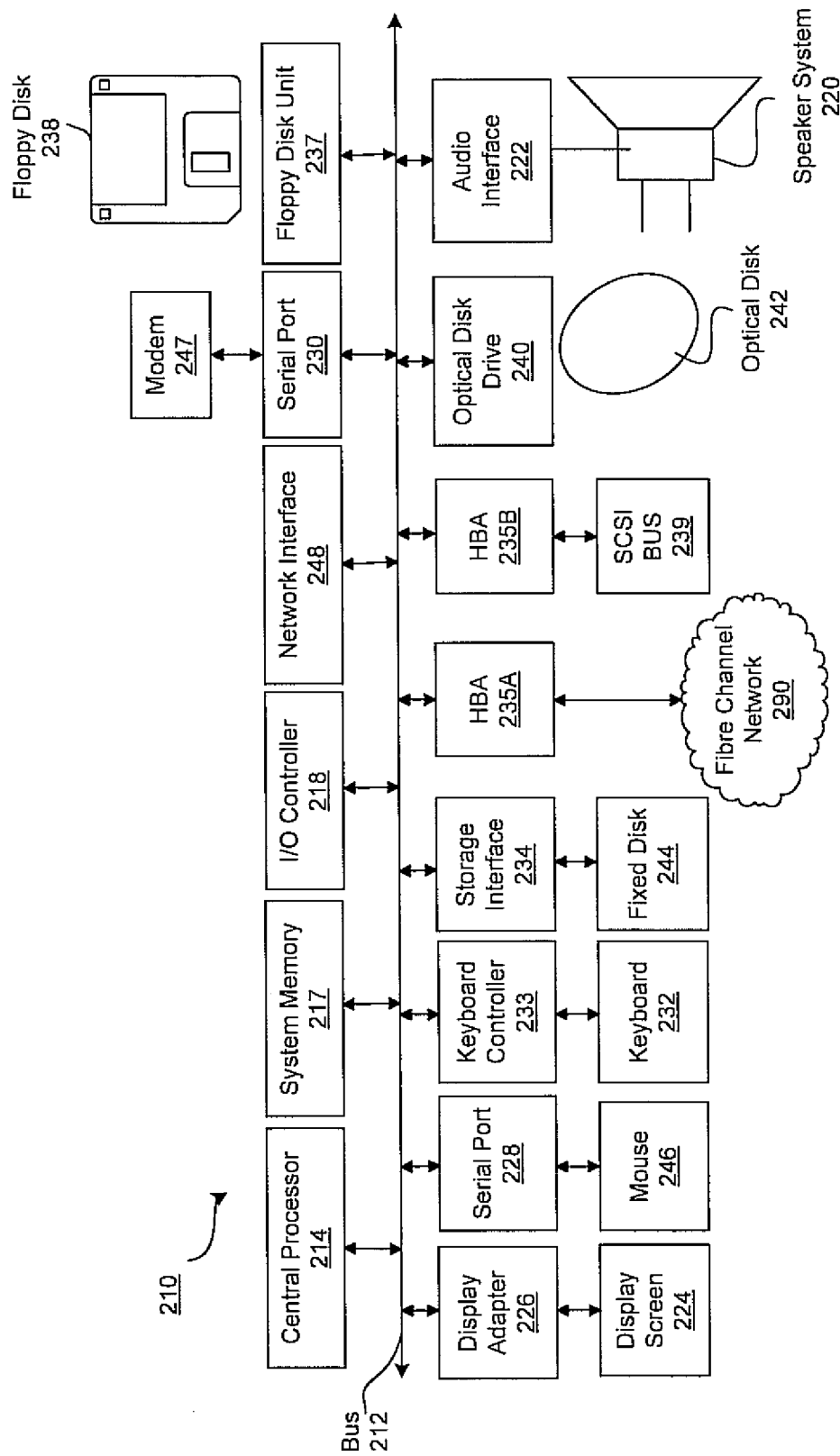
FIG. 2 is a block diagram depicting an example of a computer system upon which embodiments according to the invention can be implemented.

FIG. 2 depicts a block diagram of a computer system 210 suitable for implementing the present disclosure. In the discussion to follow, various and numerous components and elements are described. Various combinations and subsets of those components can be used to implement the devices mentioned in conjunction with FIG. 1. For example, the clients 1, 2, . . . , M may each be a full-function computer system that employs many if not all of the features of the computer system 210. However, the servers A, B, . . . , N may utilize only the subset of those features needed to support the functionality provided by those devices. For example, the servers A, B, . . . , N may not need a keyboard or display, and may execute a relatively sparse operating system that supports the functionality of data storage and data access and the management of such functionality.

In the example of FIG. 2, the computer system 210 includes a bus 212 which interconnects major subsystems of the computer system. These subsystems include a central processor 214; a system memory 217; an input/output controller 218; an external audio device, such as a speaker system 220 via an audio output interface 222; an external device, such as a display screen 224 via display adapter 226; serial ports 228 and 230; a keyboard 232 (interfaced with a keyboard controller 233); a storage interface 234; a floppy disk drive 237 operative to receive a floppy disk 238; a host bus adapter (HBA) interface card 235A operative to connect with a Fibre Channel network 290; an HBA interface card 235B operative to connect to a Small Computer System Interface (SCSI) bus 239 (alternatives to SCSI include Integrated Development Environment (IDE) and Serial Advanced Technology Attachment (SATA)); and an optical disk drive 240 operative to receive an optical disk 242. Also included are a mouse 246 (or other point-and-click device, coupled to bus 212 via serial port 228); a modem 247 (coupled to bus 212 via serial port 230); and a network interface 248 (coupled directly to bus 212). The modem 247, network interface 248 or some other method can be used to provide connectivity to the network 100 of FIG. 1.

The bus 212 of FIG. 2 allows data communication between the central processor 214 and system memory 217, which may include ROM or flash memory and RAM (not shown), as previously noted. The RAM is generally the main memory into which the operating system and application programs are loaded. The ROM or flash memory can contain, among other code, the Basic Input-Output System (BIOS) which controls basic hardware operation such as the interaction with peripheral components.

Applications resident in the computer system 210 are generally stored on and accessed via a computer-readable storage medium, such as a hard disk drive (e.g., the fixed disk 244), an optical drive (e.g., the optical drive 240), a floppy disk unit 237, or other storage medium. Applications can be in the form of electronic signals modulated in accordance with the application and data communication technology when accessed via the network modem 247 or the interface 248.

Continuing with reference to FIG. 2, storage interface 234, as with the other storage interfaces of computer system 210, can connect to a standard computer-readable storage medium for storage and/or retrieval of information, such as a fixed disk drive 244. The fixed disk drive 244 may be a part of the computer system 210, or it may be separate and accessed through other interface systems. The modem 247 may provide a direct connection to a remote server via a telephone link or to the Internet via an internet service provider (ISP). The network interface 248 may provide a direct connection to a remote server via a direct network link to the Internet via a POP (point of presence). The network interface 248 may provide such a connection using wireless techniques, including digital cellular telephone connection, Cellular Digital Packet Data (CDPD) connection, digital satellite data connection, or the like.

Many other devices or subsystems (not shown in FIG. 2) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2.

The operation of a computer system such as that shown in FIG. 2 is readily known in the art and is not discussed in detail in this application. Code to implement the present disclosure can be stored in computer-readable storage media such as one or more of the system memory 217, fixed disk 244, optical disk 242, or floppy disk 238. The operating system provided on the computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
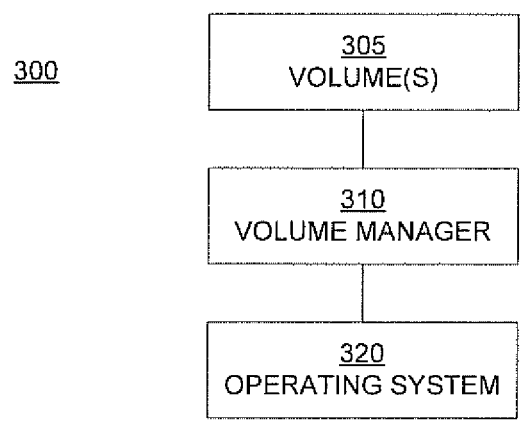
FIG. 3 is a block diagram depicting an embodiment of a volume management system.

FIG. 3 is a block diagram illustrating an embodiment of a volume management system 300. The system 300 can be implemented as computer-executable components residing on a computer-readable storage medium. For example, the system 300 can be implemented as part of a virtual machine that is implemented using the system 210 of FIG. 2.

With reference to FIG. 3, a volume manager 310 operates as a subsystem between an operating system 320 and one or more volumes 305 of data (blocks of data) that are stored in a data storage system (see FIG. 2 for examples). The data storage system may include physical storage devices such as an array of physical disks, LUNs (SCSI logical units), or other types of hardware that are used to store data. The volume manager 310 overcomes restrictions associated with the physical storage devices by providing a logical volume management layer that allows data to be spread across multiple physical disks within a disk array (not shown) in a manner that is transparent to the operating system 320, in order to distribute and/or balance input/output (I/O) operations across the physical disks. Each of the volumes 305 can retrieve data from one or more of the physical storage devices, and the volumes 305 are accessed by file systems, databases, and other applications in the same way that physical storage devices are accessed. The operation of the volume manager 310 in the manner just described is well known.

Figure 4:
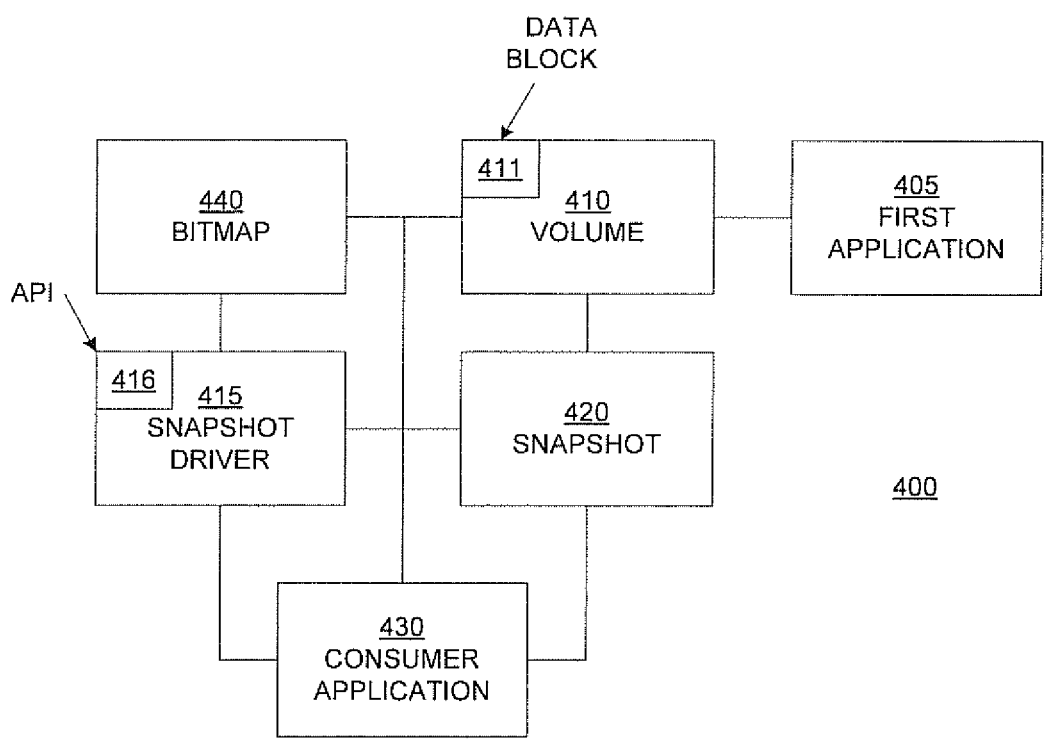
FIG. 4 is a block diagram of an embodiment of a system for managing copy-on-writes.

FIG. 4 is a block diagram illustrating a system 400 for managing copy-on-writes according to an embodiment of the present disclosure. The system 400 can be implemented as computer-executable components residing on a computer-readable storage medium (e.g., in system 210 of FIG. 2).

A volume 410 of data includes one or more blocks of data including a block 411. The volume 410 is analogous to the volume 305 of FIG. 3. The volume 410 may also be referred to as the first volume, the primary volume, or the main volume.

A snapshot 420 is associated with the volume 410 and provides a consistent, point-in-time image of the information stored in the volume 410. In the example of FIG. 4, the snapshot 420 is created by the snapshot driver 415 for use by the consumer application 430. The consumer application 430 may be a backup or replication application. The snapshot 420 allows the consumer application 430 to read one or more blocks of data without interfering with another application (e.g., first application 405) that is also making use of that information (e.g., reading/writing a block). The consumer application 430 can also read from the volume 410 as described further below.

In general, a block of data (e.g., block 411) is copied from the volume 410 to the snapshot 420 only if there is a write to that block of data; hence, the snapshot 420 is referred to as a copy-on-write snapshot. According to embodiments of the present disclosure, potential copy-on-writes for certain blocks are avoided, reducing the number of copy-on-writes and the associated overhead. For blocks of data in the volume 410 that have not changed, the snapshot 420 merely contains a pointer to the volume 410. As such, the snapshot 420 may be referred to as a space-optimized copy-on-write snapshot.

In one embodiment, a data structure (e.g., bitmap) 440 is associated with the volume 410. In general, the bitmap 440 is used to track which blocks in the volume 410 have been copy-on-written to the snapshot 420. In one embodiment, the bitmap 440 is also used by the snapshot driver 415 to indicate the blocks in the volume 410 that are of interest (and/or are not of interest) to the consumer application 430 at a particular point in time.

In one embodiment, the consumer application 430 advantageously sets the bit for a block that is not of interest to that application. The consumer application 430 may not be interested in a given block if, for example, the snapshot 420 was taken for an incremental backup and the given block is not one of the candidate blocks. In other words, the snapshot 420 may correspond to only a subset of the blocks in the volume 410, and the given block may not be in that subset.

Also, the consumer application 430 may not be interested in a given block if, for example, the given block is not part of a file or files included in a selection list for backup. In other words, the snapshot 420 may correspond to a particular file that spans multiple blocks in the volume 410, and the given block may not be part of that file.

In the examples just described, the consumer application 430 can set bits (corresponding to the blocks that the application is not interested in) at the start of its task (e.g., at the start of a backup/replication task) and/or when the snapshot 420 is created.

The consumer application 430 may also not be interested in a given block if that block was successfully read (e.g., successfully backed up/replicated) by the consumer application. In this instance, the consumer application 430 will set the corresponding bit as and/or when the read happens. As used herein, "successfully" means that the block of data was correctly and completely read and/or copied—this can be verified using, for example, a checksum or some other well known technique.

In one embodiment, the snapshot driver 415 exposes an API 416 that the consumer application 430 can use to set the bits in the bitmap 440. The consumer application 430 can set a bit (which may be referred to generally as an indicator) via the snapshot driver 415 when that application is no longer interested in the corresponding block; the bits remain set for the lifetime of the snapshot 420. The bitmap 440 is thus maintained by the snapshot driver 415, which consults the bitmap prior to a write to a block in the volume 410, before performing a potential copy-on-write for the block. The copy-on-write proceeds if the corresponding bit is not set—when the bit is not set, it indicates that the consumer application 430 is interested in the corresponding block but has not yet read that block, in which case the copy-on-write proceeds so that the consumer application will have access to the original data in the block. Conversely, if the consumer application 430 is not interested in a block, or is no longer interested in the block, then a copy-on-write of that block is not necessary; accordingly, the corresponding bit is set and the copy-on-write is not performed.

The snapshot driver can use the same bitmap 440 to track both blocks of interest to the consumer application and copy-on-writes, as follows:

a) Initially, the consumer application 430 will call the API 416 to effectively have only those bits unset that correspond to the candidate blocks for the task being performed by the consumer application (e.g., backup/replication). For a full backup/replication for the whole volume 410, for example, all the bits will be unset. For an incremental backup/replication, the bitmap 440 will be a simple function of the bitmap used to track incremental changes, and will have only those bits unset that correspond to the blocks requiring backup/replication. Similarly, for a selected block-level backup, blocks corresponding to files not part of a selection will have their respective bits set in the bitmap.

b) When a write is subsequently scheduled for a block in the volume 410, the snapshot driver 415 will consult the bitmap 440. A copy-on-write of the block can be done if the corresponding bit is not set (in the same way as that used for blocks for which a copy-on-write was done one time).

c) The consumer application 430 will call the API 416 to set a bit when the application is done with the corresponding block (done reading and backing up or replicating it successfully).

In one embodiment, instead of using one bitmap as just described, a second bitmap (not shown in FIG. 4) is also used—one bitmap may be used to track blocks of interest to the consumer application, and the second bitmap may be used to track copy-on-writes. Also, although a bitmap is described, the invention is not so limited. For example, instead of a bitmap or bitmaps, a map implemented as a series of bits that represent multiple states can be used—one bit per block can be used to track copy-on-writes, and another bit per block can be used to track blocks of interest to a consumer application (and other bits per block can be used to track blocks of interest to other consumer applications). In general, any type of data structure can be used to accomplish the functionality of the bitmap(s) described above.

Note that the above discussion is in the context of a snapshot created for a particular consumer application. Other snapshots may be created for other applications and may exist in parallel with the snapshot 420, and copy-on-writes to those other snapshots can continue to occur.

Figure 5:
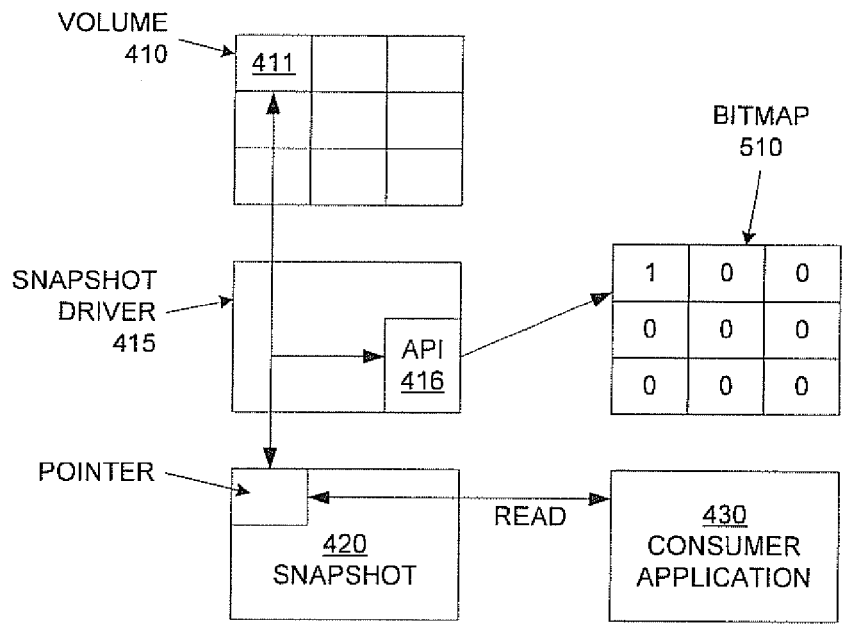
FIGS. 5, 6A, and 6B depict examples in which embodiments of systems for managing copy-on-writes are used.

FIG. 5 illustrates an example in which a consumer application 430 successfully reads (accesses, replicates, backs up, etc.) a block 411 after the snapshot 420 is created and before the block 411 is copy-on-written to the snapshot. To read the block 411, the consumer application 430 will first access the snapshot 420; because the block 411 has not been copied to the snapshot, the consumer application is pointed to the corresponding region of the volume 410.

After the block 411 is successfully read, the snapshot driver 415 (specifically, the API 416) sets a corresponding bit in the data structure 510 (which may be the bitmap 440 of FIG. 4). In the example of FIG. 5, the bit corresponding to the block 411 is set to a value of one (1). When a bit is not set (e.g., has a value of zero), it indicates that the consumer application 430 is interested in the corresponding block but has not yet read that block. Conversely, if the consumer application 430 is not interested in a block, or is no longer interested in the block, then a copy-on-write of that block is not necessary; accordingly, the corresponding bit is set and the copy-on-write is not performed. Once the corresponding bit is set in the data structure (e.g., bitmap) 510, then a subsequent attempt to write data to the block 411 will not result in that block being copy-on-written to the snapshot 420.

A similar process is performed when other blocks of data in the volume 410 are to be read by the consumer application 430. If there is an overhead associated with doing this for each block, the API 416 can be called once a threshold number of blocks are read. The API 416 can be written in such a way so that multiple bits can be set using a single call.

Note that locks and the like are not necessary for the volume 410, because if the snapshot driver 415 happens to read an unset bit before the consumer application 430 is able to set it, this will only result in an unnecessary copy-on-write.

As opposed to conventional approaches, embodiments according to the present disclosure use the consumer application to provide information to the snapshot driver as to which blocks the consumer application is interested in at a given point in time. Accordingly, point-in-time consistency need not be continually maintained for a snapshot associated with the consumer application.

Figure 6A:
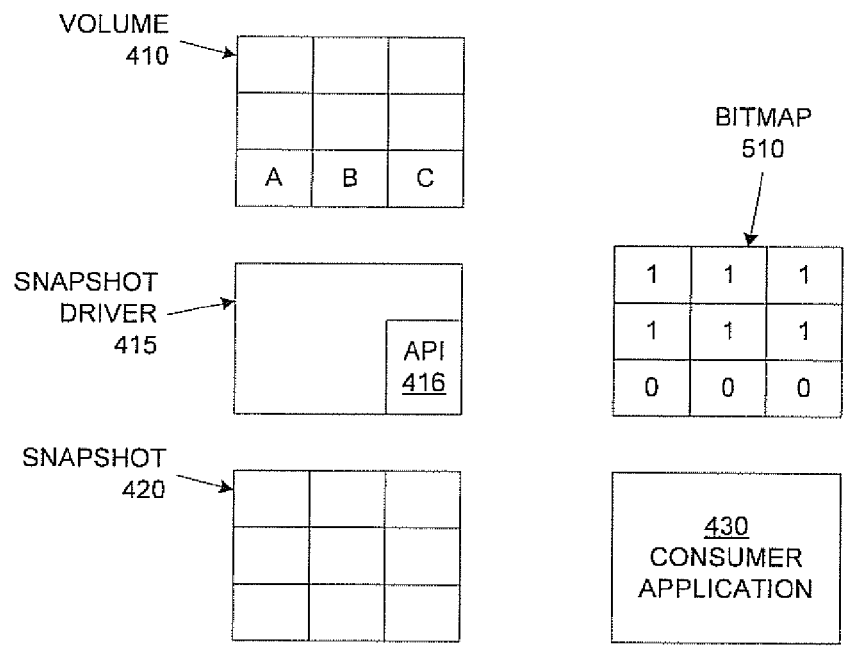
Figure 6B:
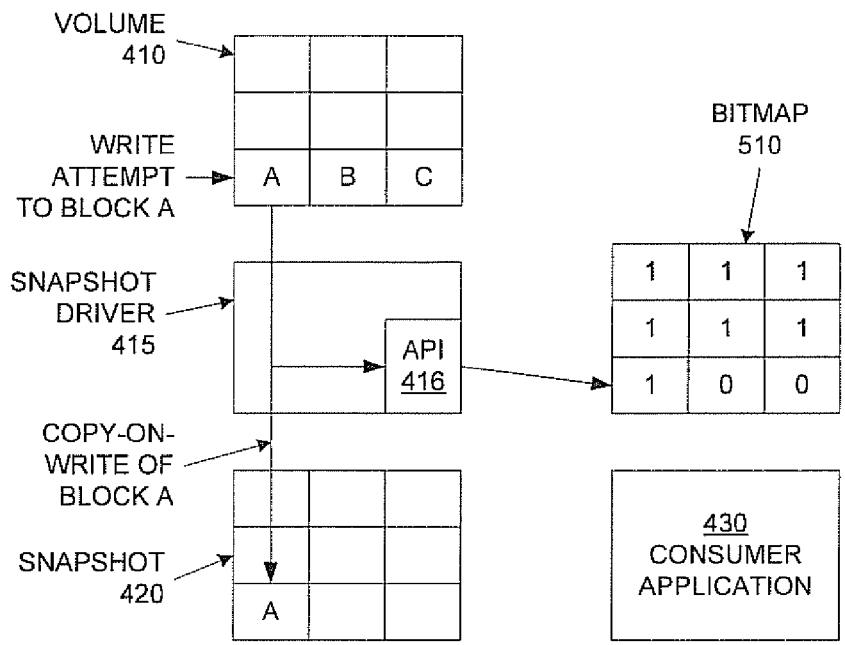

FIGS. 6A and 6B illustrate examples in which a consumer application 430 is not interested in a subset of one or more blocks because, for example, the snapshot 420 was taken for an incremental backup and the subset of blocks is not included in the candidate blocks, or the subset of blocks is not part of a file included in the selection list for backup.

For example, the consumer application 430 may be performing only an incremental backup of the volume 410—that is, only a portion of the volume 410 (e.g., blocks A, B, and C) is to be backed up/replicated. Accordingly, the snapshot 420 may only be for blocks A, B, and C, in which case the bits for blocks A, B, and C are not set and the bits for the other blocks in the volume 411 are set, as shown in FIG. 6A. When a bit is not set, it indicates that the consumer application 430 is interested in the corresponding block but has not yet accessed that block.

Thus, as shown in FIG. 6B, an attempt to write to any of the blocks A, B, and C before the consumer application 430 has a chance to access (read/backup/replicate) the data in that block will result in a copy-on-write of the block to the snapshot 420. After the copy-on-write is completed, the corresponding bit in the data structure (e.g., bitmap) 510 is set as shown in FIG. 6B, so that subsequent attempts to write to that block in the volume 410 will not trigger another copy-on-write.

As another example, the consumer application 430 may be backing up a file that may span multiple blocks (e.g., blocks A, B, and C). In a manner similar to that just described, the snapshot 420 may only may include blocks A, B, and C, in which case the bits for blocks A, B, and C are not set and the bits for the other blocks in the volume 411 are set, as shown in FIG. 6A. As shown in FIG. 6B, an attempt to write to any of the blocks A, B, and C before the consumer application 430 has a chance to access (read/backup/replicate) the data in that block will result in a copy-on-write of the block to the snapshot 420. After the copy-on-write is completed, the corresponding bit in the data structure (e.g., bitmap) 510 is set, as shown in FIG. 6B.

Figure 7:
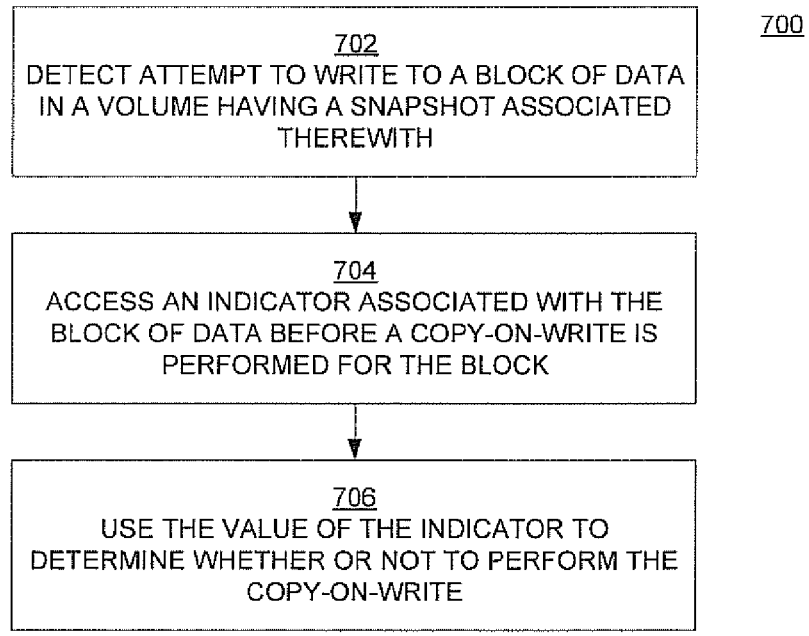
FIGS. 7 and 8 are flowcharts depicting embodiments of computer-implemented methods for managing copy-on-writes to snapshots.
Figure 8:
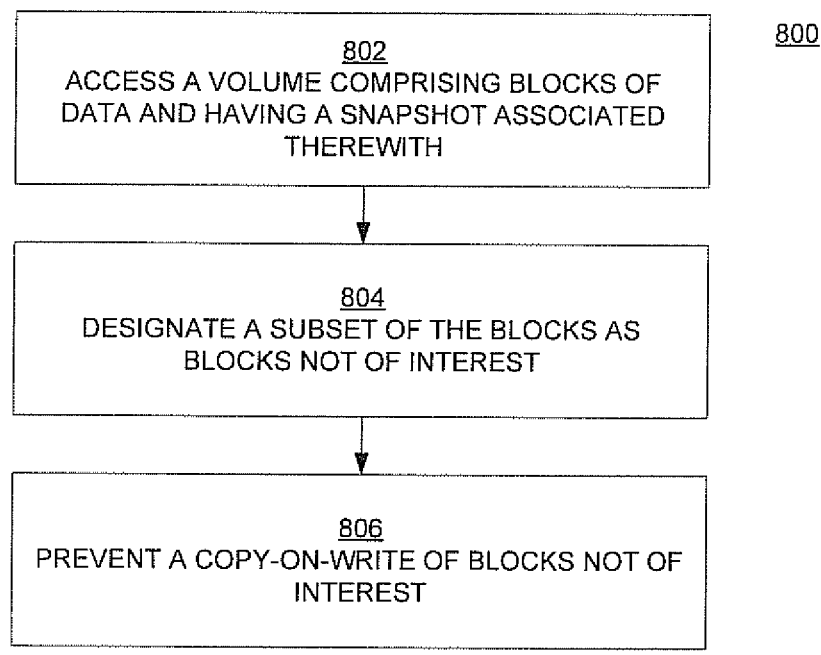

FIGS. 7 and 8 are flowcharts 700 and 800, respectively, illustrating embodiments of computer-implemented methods for managing copy-on-writes to snapshots. Flowcharts 700 and 800 can be implemented as computer-executable instructions residing on some form of computer-readable storage medium (e.g., in the system 210 of FIG. 2).

In block 702 of FIG. 7, with reference also to FIG. 4, an attempt to write to a block of data in a first volume of data (e.g., volume 410) is detected. A copy-on-write snapshot volume 420 is associated with the first volume, but the snapshot volume does not include a copy of the block of data.

In block 704, an indicator (e.g., a bit in a bitmap) associated with the block of data is accessed before a copy-on-write operation to the snapshot volume is performed for the block of data.

In block 706, the value of the indicator is used to determine whether or not to perform a copy-on-write operation for the block of data, as previously described herein. Thus, even though a block of data is not in the snapshot and the block may be overwritten with new data, in some cases (such as those described above) the block is not copy-on-written to the snapshot. As such, the number of copy-on-writes is advantageously reduced. In other words, a copy-on-write that would occur conventionally may not occur according to embodiments of the present disclosure.

In block 802 of FIG. 8, with reference also to FIG. 4, a volume of data (e.g., volume 410) comprising multiples blocks of data is accessed. A copy-on-write snapshot 420 is associated with the volume.

In block 804, a subset of the blocks is designated as blocks not of interest to a consumer application. In one embodiment, a respective bit per block is set to indicate blocks that are not of interest. The snapshot does not include a copy of blocks of data in the subset.

In block 806, a copy-on-write (to the snapshot) of a block of data included in the subset is prevented, while a copy-on-write (to the snapshot) of a block of data not included in the subset is allowed. Again, if a block is not of interest to the consumer application, then that block is not copy-on-written to the snapshot even though that block is not in the snapshot and may be overwritten. Thus, the number of copy-on-writes can be reduced.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

For example, embodiments according to the present disclosure can also be used to good effect if the consumer application has some information about the order in which writes happen to a volume, and is able to make use of this information to read (e.g., back up or replicate) blocks in a specific order and thus avoid the necessity to copy-on-write a block that is going to be written to in the near future. This would work even if the backup destination (at least the immediate destination) is disk memory.

More specifically, with reference back to FIG. 4, blocks are generally read in sequential order. As such, the first application 405 can inform the snapshot driver 415 of an impending write to a block in the volume 410. The consumer application 430 can also be informed of the impending write, so that the consumer application can also read the block before the write occurs. As a result, the bit can be set for that block so that the block does not have to be copy-on-written to the snapshot 420 for the purposes of the consumer application 430.

Also, although embodiments according to the present disclosure are explained in the context of snapshots at the volume level, they can be used for snapshots at all levels where copy-on-writes are performed. Also note that, even though only backup and replication applications are mentioned, embodiments according to this invention can be used with other types of applications that are consumers of a copy-on-write snapshot.

Embodiments according to the present disclosure are useful for reducing copy-on-writes for incremental as well as full reads of a snapshot, and are particularly significant for full backup/replication operations. Embodiments are also useful in scenarios in which a snapshot is persisted, such as when a failed job is retried, where some data is already used by the consumer application and there is a delay before the remaining data is used.

Embodiments according to the invention are thus described. While the present disclosure has been described in particular embodiments, it should be appreciated that the invention should not be construed as limited by such embodiments, but rather construed according to the below claims.

What is claimed is:

1. A computer memory that stores computer-executable instructions that, when executed, cause a computer system to perform a method comprising:
    detecting an attempt to write to a block of data in a first volume of data by a first application, wherein a copy-on-write snapshot volume is associated with said first volume, wherein said snapshot volume does not include a copy of said block of data, and wherein said snapshot volume includes a pointer that points to said block of data in said first volume;
    prior to performing a copy-on-write operation by a snapshot driver to said snapshot volume for said block of data, accessing an indicator associated with said block of data in response to said attempt to write to said block of data by said first application, wherein a value of said indicator is set to a first value by a second application via said snapshot driver when said block of data is not of interest to said second application or said block of data was read by said second application prior to said attempt to write to said block of data by said first application; and
    determining, based on said value of said indicator, whether said copy-on-write operation is to be performed by said first application for said block of data in response to said attempt to write by said first application, wherein said copy-on-write operation is not performed by said first application if said indicator is set to said first value.

2. The computer memory of claim 1 wherein said snapshot volume is for a portion of said first volume and said block of data is not in said portion, and wherein said copy-on-write operation is therefore not performed for said block of data.

3. The computer memory of claim 1 wherein said snapshot volume is for a file spanning a subset of blocks of data and said block of data is not in said subset, and wherein said copy-on-write operation is therefore not performed for said block of data.

4. The computer memory of claim 1 wherein said method further comprises maintaining a first bitmap of said first volume, and wherein said indicator comprises a bit value in said first bitmap.

5. The computer memory of claim 4 wherein said method further comprises maintaining a second bitmap of said first volume, and wherein said second bitmap tracks blocks of data that have been written to said snapshot volume.

6. The computer memory of claim 1, wherein the value of said indicator is set to a first value by the second application via said snapshot driver when said block of data is not of interest to said second application or said block of data was read by said second application prior to said attempt to write to said block of data by said first application comprises an indication that said block was previously backed up by said second application.

7. The computer memory of claim 1, wherein the value of said indicator is set to a first value by the second application via said snapshot driver when said block of data is not of interest to said second application or said block of data was read by said second application prior to said attempt to write to said block of data by said first application comprises an indication that said block was previously replicated by said second application.

8. A computer memory that stores computer-executable instructions that, when executed, cause a computer system to perform a method comprising:
    attempting, by a first application, to write to a block of data in a volume of data comprising a plurality of blocks of data, wherein a copy-on-write snapshot is associated with said volume;
    designating, by a second application, a subset of said blocks of data as blocks not of interest to said second application or as having been read by said second application prior to said attempt to write to said block of data, wherein said snapshot does not include a copy of blocks of data in said subset, said designating comprising setting a respective bit in a data structure maintained by a snapshot driver for a block of data in said subset; and
    in response to said attempt to write to said block of data by said first application, preventing a copy-on-write operation by said snapshot driver to said snapshot for said block of data, and allowing a copy-on-write operation by said snapshot driver to said snapshot for a block of data not included in said subset.

9. The computer memory of claim 8 wherein said snapshot is for a portion of said volume and said subset is not in said portion.

10. The computer memory of claim 8 wherein said snapshot is for a file spanning multiple blocks and said subset is not part of said file.

11. The computer memory of claim 8 wherein said data structure comprises a bitmap for said volume.

12. The computer memory of claim 11 wherein said method further comprises updating said bitmap each time a block of data in said volume is successfully read before a copy-on-write operation to said snapshot is performed for said block of data.

13. The computer memory of claim 8, wherein designating, by the second application, the subset of said blocks of data as blocks not of interest to said second application or as having been read by said second application prior to said attempt to write to said block of data, comprises an indication that said second application previously backed up the subset of said blocks of data.

14. The computer memory of claim 8, wherein designating, by the second application, the subset of said blocks of data as blocks not of interest to said second application or as having been read by said second application prior to said attempt to write to said block of data comprises an indication that said second application previously replicated the subset of said blocks of data.

15. A non-transitory computer storage medium that stores computer-executable components comprising:
  a first application configured to write data to a volume comprising a plurality of blocks of data;
  a snapshot driver configured to create a snapshot for said volume and maintain a bitmap having bits corresponding to said plurality of blocks of data; and
  a second application configured to read data from said volume and from said snapshot, wherein said second application designates a subset of said blocks of data as blocks not of interest, wherein said snapshot does not include a copy of blocks of data in said subset, wherein said bitmap for said volume is used to track which of said blocks is in said subset, wherein a block of data in said volume that is read by said second application is added to said subset by said second application via said snapshot driver and said bitmap is updated by said second application via the snapshot driver in response to the read of said block of data, wherein a copy-on-write operation to said snapshot by said snapshot driver for said block of data is not performed in response to a write to said block of data by said first application after said bitmap is updated, and wherein a copy-on-write operation to said snapshot by said snapshot driver for a block of data not in said subset is performed in response to a write to said block of data not in said subset by said first application.

16. The non-transitory computer storage medium of claim 15 wherein said snapshot is for a portion of said volume and said subset is not in said portion.

17. The non-transitory computer storage medium of claim 15 wherein said snapshot is for a file that spans a portion of said volume and said subset is not in said portion.

18. The non-transitory computer storage medium of claim 15 wherein a second bitmap of said volume is used to track which blocks of data have been written to said snapshot after having been written to in said volume.

19. The non-transitory computer storage medium of claim 15, wherein the designation of the subset of said blocks of data as blocks not of interest by said second application comprises an indication that the subset of said blocks was previously backed up.

20. The non-transitory computer storage medium of claim 15, wherein the designation of the subset of said blocks of data as blocks not of interest by said second application comprises an indication that the subset of said blocks was previously replicated.

* * * * *